United States Patent
Lacy et al.

(10) Patent No.: US 7,475,854 B2
(45) Date of Patent: Jan. 13, 2009

(54) AIRCRAFT TRAILING EDGE DEVICES, INCLUDING DEVICES WITH NON-PARALLEL MOTION PATHS, AND ASSOCIATED METHODS

(75) Inventors: Douglas S. Lacy, Bothell, WA (US); Kevin W. Beyer, Seattle, WA (US); Stephen T. Brown, Everett, WA (US); Paul W. Dees, Woodinville, WA (US); Neal V. Huynh, Bellevue, WA (US); Jan A. Kordel, Redmond, WA (US); Clayton A. Prow, Everett, WA (US); Seiya Sakurai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/284,247

(22) Filed: Nov. 21, 2005

(65) Prior Publication Data

US 2007/0114329 A1 May 24, 2007

(51) Int. Cl.
 *B64C 3/50* (2006.01)
(52) U.S. Cl. .................. 244/215; 244/212; 244/213; 244/214; 244/216; 244/217
(58) Field of Classification Search .......... 244/212–217
 See application file for complete search history.

(56) References Cited

U.S. PATENT DOCUMENTS

| | | |
|---|---|---|
| 1,724,456 A | 8/1929 | Crook |
| 1,770,575 A | 7/1930 | Ksoll |
| 1,913,169 A | 6/1933 | Martin |
| 2,086,085 A | 7/1937 | Lachmann et al. |
| 2,169,416 A | 8/1939 | Griswold |

(Continued)

FOREIGN PATENT DOCUMENTS

DE 387 833 1/1924

(Continued)

OTHER PUBLICATIONS

U.S. Appl. No. 11/134,019, Voogt.

(Continued)

*Primary Examiner*—Michael R. Mansen
*Assistant Examiner*—Philip J Bonzell
(74) *Attorney, Agent, or Firm*—Perkins Coie LLP

(57) ABSTRACT

Aircraft trailing edge devices, including devices with non-parallel motion paths, and associated methods are disclosed. A device in accordance with one embodiment includes a wing and an inboard trailing edge device coupled to the wing and movable relative to the wing between a first stowed position and a first deployed position along a first motion path. An outboard trailing edge device can be coupled to the wing outboard of the inboard trailing edge device, and can be movable relative to the wing along a second motion path that is non-parallel to the first motion path. An intermediate trailing edge device can be coupled between the inboard and outboard trailing edge devices and can be movable along a third motion path that is non-parallel to both the first and second motion paths. Each of the trailing edge devices can open a gap relative to the wing when moved to their respective deployed positions.

25 Claims, 7 Drawing Sheets

U.S. PATENT DOCUMENTS

| | | |
|---|---|---|
| 2,282,516 A | 5/1942 | Hans et al. |
| 2,289,704 A | 7/1942 | Grant |
| 2,319,383 A | 5/1943 | Zap |
| 2,347,230 A | 4/1944 | Zuck |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Lawrence et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A | 8/1965 | Hoover |
| 3,203,647 A | 8/1965 | Alvarez-Calderon |
| 3,263,946 A | 8/1966 | Roberts et al. |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregor |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A * | 10/1976 | Dean et al. .................. 244/216 |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,106,730 A | 8/1978 | Spitzer et al. |
| 4,117,996 A | 10/1978 | Sherman |
| 4,120,470 A * | 10/1978 | Whitener .................... 244/213 |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A * | 12/1982 | Buus et al. .................... 701/4 |
| 4,365,774 A | 12/1982 | Coronel |
| 4,368,937 A | 1/1983 | Palombo et al. |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,637,573 A | 1/1987 | Perin |
| 4,650,140 A | 3/1987 | Cole |
| 4,691,879 A | 9/1987 | Greene |

| | | | | | | |
|---|---|---|---|---|---|---|
| 4,700,911 A | 10/1987 | Zimmer | | 5,984,230 A | 11/1999 | Drazi |
| 4,702,441 A | 10/1987 | Wang | | 6,015,117 A | 1/2000 | Broadbent |
| 4,702,442 A | 10/1987 | Weiland et al. | | 6,033,180 A | 3/2000 | Machida et al. |
| 4,706,913 A | 11/1987 | Cole | | 6,045,204 A | 4/2000 | Frazier |
| 4,712,752 A | 12/1987 | Victor | | 6,073,624 A | 6/2000 | Laurent |
| 4,717,097 A | 1/1988 | Sepstrup | | 6,076,767 A | 6/2000 | Farley |
| 4,720,066 A | 1/1988 | Renken et al. | | 6,076,776 A | 6/2000 | Breitbach |
| 4,729,528 A | 3/1988 | Borzachillo | | 6,079,672 A | 6/2000 | Lam et al. |
| 4,747,375 A | 5/1988 | Williams | | 6,082,679 A | 7/2000 | Crouch et al. |
| 4,776,822 A | 10/1988 | Dougherty et al. | | 6,109,567 A | 8/2000 | Munoz |
| 4,784,355 A | 11/1988 | Brine | | 6,145,791 A | 11/2000 | Diller et al. |
| 4,786,013 A | 11/1988 | Pohl | | 6,152,405 A | 11/2000 | Muller et al. |
| 4,789,119 A | 12/1988 | Bellego et al. | | 6,161,801 A | 12/2000 | Kelm et al. |
| 4,796,192 A | 1/1989 | Lewis | | 6,164,598 A | 12/2000 | Young et al. |
| 4,823,836 A | 4/1989 | Bachmann et al. | | 6,173,924 B1 | 1/2001 | Young et al. |
| 4,834,319 A | 5/1989 | Ewy et al. | | 6,189,837 B1 | 2/2001 | Matthews |
| 4,838,503 A | 6/1989 | Williams et al. | | 6,213,433 B1 | 4/2001 | Gruensfelder |
| 4,854,528 A | 8/1989 | Hofrichter et al. | | 6,227,498 B1 | 5/2001 | Arata |
| 4,856,735 A | 8/1989 | Lotz | | 6,244,542 B1 | 6/2001 | Young et al. |
| 4,867,394 A | 9/1989 | Patterson, Jr. et al. | | 6,293,497 B1 | 9/2001 | Kelley-Wickemeyer |
| 4,892,274 A | 1/1990 | Pohl et al. | | 6,328,265 B1 | 12/2001 | Dizdarevic |
| 4,899,284 A | 2/1990 | Lewis | | 6,349,798 B1 | 2/2002 | McKay |
| 4,962,902 A | 10/1990 | Fortes | | 6,349,903 B2 | 2/2002 | Caton et al. |
| 5,039,032 A | 8/1991 | Rudolph | | 6,364,254 B1 | 4/2002 | May |
| 5,046,688 A | 9/1991 | Woods | | 6,375,126 B1 | 4/2002 | Sakurai |
| 5,050,081 A | 9/1991 | Abbott et al. | | 6,382,566 B1 | 5/2002 | Ferrel et al. |
| 5,056,741 A | 10/1991 | Bliesner et al. | | 6,431,498 B1 | 8/2002 | Watts et al. |
| 5,074,495 A | 12/1991 | Raymond | | 6,439,512 B1 | 8/2002 | Hart |
| 5,082,207 A | 1/1992 | Tulinius | | 6,443,394 B1 | 9/2002 | Weisend |
| 5,082,208 A | 1/1992 | Matich | | 6,450,457 B1 | 9/2002 | Sharp |
| 5,088,665 A | 2/1992 | Vijgen | | 6,464,175 B2 | 10/2002 | Yada et al. |
| 5,094,411 A | 3/1992 | Rao | | 6,464,176 B2 * | 10/2002 | Uchida et al. ............... 244/216 |
| 5,094,412 A | 3/1992 | Narramore | | 6,466,141 B1 | 10/2002 | McKay et al. |
| 5,100,082 A | 3/1992 | Archung | | 6,478,541 B1 | 11/2002 | Charles et al. |
| 5,114,100 A | 5/1992 | Rudolph | | 6,481,667 B1 | 11/2002 | Ho |
| 5,129,597 A | 7/1992 | Manthey | | 6,484,969 B2 | 11/2002 | Sprenger et al. |
| 5,158,252 A | 10/1992 | Sakurai | | 6,499,577 B2 | 12/2002 | Kitamoto et al. |
| 5,167,383 A | 12/1992 | Nozaki | | 6,536,714 B2 | 3/2003 | Gleine et al. |
| 5,203,619 A | 4/1993 | Welsch | | 6,547,183 B2 | 4/2003 | Farnsworth |
| 5,207,400 A | 5/1993 | Jennings | | 6,554,229 B1 | 4/2003 | Lam |
| 5,244,269 A | 9/1993 | Harriehausen | | 6,561,463 B1 | 5/2003 | Yount et al. |
| 5,259,293 A | 11/1993 | Brunner | | 6,591,169 B2 | 7/2003 | Jones et al. |
| 5,280,863 A | 1/1994 | Schmittle | | 6,598,829 B2 | 7/2003 | Kamstra |
| 5,282,591 A | 2/1994 | Walters et al. | | 6,598,834 B2 | 7/2003 | Nettle et al. |
| 5,310,387 A | 5/1994 | Savagian | | 6,601,801 B1 | 8/2003 | Prow |
| 5,351,914 A | 10/1994 | Nagao | | 6,622,972 B2 | 9/2003 | Urnes |
| 5,388,788 A | 2/1995 | Rudolph | | 6,622,974 B1 | 9/2003 | Dockter et al. |
| 5,420,582 A | 5/1995 | Kubbat | | 6,625,982 B2 | 9/2003 | Van Den Bossche et al. |
| 5,441,218 A | 8/1995 | Mueller | | 6,644,599 B2 | 11/2003 | Perez |
| 5,474,265 A | 12/1995 | Capbern | | 6,651,930 B1 | 11/2003 | Gautier et al. |
| 5,493,497 A | 2/1996 | Buus | | 6,729,583 B2 | 5/2004 | Milliere et al. |
| 5,535,852 A | 7/1996 | Bishop | | 6,745,113 B2 | 6/2004 | Griffin |
| 5,542,684 A | 8/1996 | Squirrell | | 6,755,375 B2 | 6/2004 | Trikha |
| 5,544,847 A | 8/1996 | Bliesner | | 6,796,526 B2 | 9/2004 | Boehringer |
| 5,564,655 A | 10/1996 | Garland et al. | | 6,796,534 B2 | 9/2004 | Beyer et al. |
| 5,600,220 A | 2/1997 | Thoraval | | 6,799,739 B1 | 10/2004 | Jones |
| 5,609,020 A | 3/1997 | Jackson | | 6,802,475 B2 | 10/2004 | Davies et al. |
| 5,680,124 A | 10/1997 | Bedell | | 6,824,099 B1 | 11/2004 | Jones |
| 5,681,014 A | 10/1997 | Palmer | | 6,843,452 B1 | 1/2005 | Vassberg et al. |
| 5,686,907 A | 11/1997 | Bedell | | 6,860,452 B2 | 3/2005 | Bacon et al. |
| 5,711,496 A | 1/1998 | Nusbaum | | 6,870,490 B2 | 3/2005 | Sherry et al. |
| 5,735,485 A | 4/1998 | Ciprian et al. | | 6,910,659 B2 * | 6/2005 | Friddell et al. .......... 244/135 R |
| 5,740,991 A | 4/1998 | Gleine et al. | | 6,981,676 B2 * | 1/2006 | Milliere ...................... 244/213 |
| 5,743,490 A * | 4/1998 | Gillingham et al. ......... 244/99.9 | | 7,007,897 B2 | 3/2006 | Wingett et al. |
| 5,788,190 A | 8/1998 | Siers | | 7,028,948 B2 | 4/2006 | Pitt |
| 5,836,550 A * | 11/1998 | Paez ........................... 244/214 | | 7,048,228 B2 | 5/2006 | Vassberg et al. |
| 5,839,698 A | 11/1998 | Moppert | | 7,048,234 B2 | 5/2006 | Recksiek et al. |
| 5,875,998 A | 3/1999 | Gleine | | 7,048,235 B2 | 5/2006 | McLean et al. |
| 5,915,653 A | 6/1999 | Koppelman | | 7,051,975 B2 | 5/2006 | Pohl et al. |
| 5,921,506 A | 7/1999 | Appa | | 7,059,563 B2 | 6/2006 | Huynh |
| 5,927,656 A | 7/1999 | Hinkleman | | 7,258,308 B2 * | 8/2007 | Beyer et al. ................. 244/216 |
| 5,934,615 A | 8/1999 | Treichler | | 7,338,018 B2 * | 3/2008 | Huynh et al. ............... 244/215 |
| 5,978,715 A | 11/1999 | Briffe | | 2001/0006207 A1 | 7/2001 | Caton et al. |

| | | | |
|---|---|---|---|
| 2002/0046087 | A1 | 4/2002 | Hey |
| 2002/0074459 | A1 | 6/2002 | Gleine et al. |
| 2002/0100842 | A1 | 8/2002 | Perez |
| 2002/0184885 | A1 | 12/2002 | Blot-Carretero et al. |
| 2003/0058134 | A1 | 3/2003 | Sherry |
| 2003/0132860 | A1 | 7/2003 | Feyereisen |
| 2003/0197097 | A1* | 10/2003 | Wakayama .................. 244/215 |
| 2003/0230677 | A1 | 12/2003 | Milliere |
| 2004/0004162 | A1 | 1/2004 | Beyer |
| 2004/0046087 | A1 | 3/2004 | Beyer et al. |
| 2004/0059474 | A1 | 3/2004 | Boorman |
| 2004/0195464 | A1 | 10/2004 | Vassberg et al. |
| 2004/0217575 | A1 | 11/2004 | Beaujot et al. |
| 2004/0245386 | A1 | 12/2004 | Huynh |
| 2005/0011994 | A1 | 1/2005 | Sakurai et al. |
| 2005/0017126 | A1 | 1/2005 | McLean et al. |
| 2005/0045765 | A1 | 3/2005 | Pitt |
| 2005/0061922 | A1 | 3/2005 | Milliere |
| 2005/0151028 | A1 | 7/2005 | Pohl et al. |
| 2005/0242234 | A1 | 11/2005 | Mahmulyin |
| 2005/0274847 | A1 | 12/2005 | Charron |
| 2006/0000952 | A1 | 1/2006 | Rampton et al. |
| 2006/0038086 | A1 | 2/2006 | Reckzeh |
| 2006/0102803 | A1 | 5/2006 | Wheaton et al. |
| 2007/0252040 | A1 | 11/2007 | Kordel et al. |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 215 211 | 3/1987 |
| EP | 0 483 504 A1 | 5/1992 |
| EP | 0 781 704 | 7/1997 |
| EP | 0 947 421 | 10/1999 |
| EP | 1010616 | 6/2000 |
| EP | 1338506 | 8/2003 |
| EP | 1 462 361 | 9/2004 |
| EP | 1 547 917 A1 | 6/2005 |
| FR | 705155 | 6/1931 |
| FR | 984 443 | 7/1951 |
| FR | 56 121 | 9/1952 |
| FR | 57988 | 9/1953 |
| FR | 58 273 | 11/1953 |
| GB | 2 144 688 A | 3/1985 |

OTHER PUBLICATIONS

U.S. Appl. No. 11/200,843, Sakurai et al.
U.S. Appl. No. 11/284,113, Lacy et al.
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
"Morphing Aircraft Structure,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16;[Accessed Aug. 7, 2003].
Moog, Component Maintenance Manual, May 1994 (2 pages).
Morphiing Systems, "Morphing Aerostructures-An Overview," www.crgrp.net/morphingsystems.htm, pp. 1-9; [accessed Aug. 31, 2005].
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978, p. 80-89.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5 TU-144 CANARD, (date unknown), 1 pg.
Whitcomb, Richard T., "Review of NASA Supercritical Airfoils," National Aeornautics and Space Administration, Aug. 1974 (pp. 8-18).
U.S. Appl. No. 09/714,026, filed Nov. 16, 2000, Sakurai.
U.S. Appl. No. 09/921,212, filed Aug. 2, 2001, Farnsworth.
U.S. Appl. No. 10/454,417, Neal V. Huynh.
U.S. Appl. No. 10/671,435, Robert Kelley-Wickemeyer.
U.S. Appl. No. 10/746,883, Boorman.
U.S. Appl. No. 10/746,912, Boorman.
U.S. Appl. No. 10/770,256, Speer.
U.S. Appl. No. 10/786,100, Lacy.
U.s. Appl. No. 10/787,644, Tafs et al.
U.S. Appl. No. 10/789,100, Lacy et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones.
U.S. Appl. No. 11/048,320, Konings.
U.S. Appl. No. 11/051,738, Huynh et al.
U.S. Appl. No. 11/116,905, Good et al.
U.S. Appl. No. 60/475,828, Whitener.
International Search Report and Written Opinion for PCT/US2006/045001, Feb. 5, 2007, The Boeing Company, 13 pages.
"Slats." Wikipedia, The Free Encyclopedia. Jun. 27, 2006, 12:32 UTC. Wikimedia Foundation, Inc. Aug. 5, 2006; http://wn.wikipedia.org/w/index.php?title=Slats&oldid=60827639>[8107 OA].
777 High Lift System, 777 Maintenance Manual, Publication Date: Circa 1994 (1 page).
777 Maintenance Manual, Flap Transmission and Support, Publication Date: Circa 1994 (1 page).
Leaf Spring Retainer Seals; EMP, Inc.; 2 pgs; emp.com; [accessed Apr. 27, 2005].
Rea, J., "Boeing 777 High Lift Control System," Boeing Commercial Airplane Group, IEEE AES Systems Magazine, Aug. 1993, pp. 15-21.

* cited by examiner

AIRCRAFT TRAILING EDGE DEVICES, INCLUDING DEVICES WITH NON-PARALLEL MOTION PATHS, AND ASSOCIATED METHODS

TECHNICAL FIELD

The present invention is directed generally toward aircraft trailing edge devices, including devices with non-parallel motion paths, and associated methods.

BACKGROUND

Modern high-speed aircraft generally have thin wings that provide a low drag profile during high-speed or cruise flight. The wings of these aircraft often include various movable surfaces to provide aircraft control and/or to configure the aircraft for low-speed operations (e.g., take-off and landing). For example, in addition to carrying fuel, the wings of a high-speed transport aircraft typically include aileron surfaces, spoiler surfaces, leading edge devices, and trailing edge flap surfaces. These movable surfaces are often located at or near the leading and trailing edges of the wings, and are each movable between a stowed position and a variety of deployed positions, depending upon the particular flight condition of the aircraft.

FIG. 1A is a partially schematic illustration of a portion of an aircraft 10a (in this case, a Boeing 767 aircraft) having a fuselage 11 and a wing 20 with high lift devices configured in accordance with the prior art. The high lift devices can include deployable slats 21 positioned toward the trailing edge of the wing 20. The trailing edge devices can include an outboard aileron 34, an outboard flap 32a, an inboard aileron 60a, and an inboard flap 31a. THe inboard and outboard ailerons 60a, 34 can be used generally for roll control of the aircraft 10a, and the inboard and outboard flaps 31a, 32a can be used to control the lift of the aircraft 10a at lower speeds (e.g., during take-off and landing). The ailerons 60a, 34 are simple hinged devices that are ungapped when in their deployed positions. Conversely, when the inboard and outboard flaps 31a, 32a are deployed, they move in an aft direction to open a gap relative to the wing 20. This aft motion is shown schematically be motion paths 41a and 42a, respectively. Because the inboard flap motion path 41a converges with the outboard flap motion path 42a, the inboard aileron 60a located between the inboard flap 31a and the outboard flap 32a does not move aft when deployed (as indicated by motion path 43a) so as to avoid interference with the adjacent flaps 31a, 32a.

FIG. 1B is a cross-sectional illustration of the inboard aileron 60a, illustrating the location of a hinge line 61 about which the inboard aileron 60a pivots relative to the wing 20. Because the hinge line 61 is located toward the front of the inboard aileron 60a and within the contour of the inboard aileron 60a, a gap does not open between the inboard aileron 60a and the wing when the inboard aileron 60a deflects either upwardly or downwardly. Instead, the leading edge 71 of the inboard aileron 60a remains in close proximity to an aft-facing cove 37 of the wing 20.

FIG. 1C is a partially schematic illustration of a portion of another aircraft 10b (in this case, a Boeing 777 aircraft) having a fuselage 11 and a wing 20 with high lift devices configured in accordance with another prior art arrangement. The trailing edge devices can include an inboard flap 31b, an outboard flap 32b, and a flaperon 60b, all of which can travel aft during deployment to open corresponding gaps relative to the wing 20. Accordingly, the inboard flap 31b can travel aft along an inboard flap motion path 42b. Because the inboard and outboard flap motion paths 41b, 42b are generally parallel, the flaperon 60b can also move aft to a gapped position along a flaperon motion path 43b that is generally parallel to the inboard and outboard flapl motion paths 41b, 42b. Inboard spoilers 51 and outboard spoilers 52 can be used as speed brakes and/or to control the size of the gap between the wing 20 and the flaps 31b, 32b.

An advantage of the arrangement shown in FIG. 1C when compared with the arrangement shown in FIGS. 1A and 1B is that the aft motion of the flaperon 60b can allow it to be deployed to greater deflections without causing flow separations, by virtue of the gap that opens between the flaperon 60b and the wing 20. Accordingly, the flaperon 60b can be operated at high deflection rates for roll control, and at high deflection angles for lift control. However, a potential drawback with this arrangement is that complex mechanisms are typically required to deploy the flaperon 60b to its aft configuration, particularly if the mechanism is configured to fit within a shallow wing section, so as to reduce the size of external fairings. On the other hand, simple mechanisms (e.g., a simple hinge), tend to extend well beyond the contours of the wing section, which requires relatively large, heavy hinge suppports and associated fairings that generate drag. Accordingly, there is a need for improved, lightweight trailing edge devices.

SUMMARY

The following summary is provided for the benefit of the reader only, and is not intended to limit in any way the invention as set forth by the claims. An aircraft sysyem in accordance with one aspect of the invention includes a wing and an inboard trailing edge device coupled to the wing and movable relative to the wing between a first stowed position and a first deployed position along a first motion path. An outboard trailing edge device can be coupled to the wing outboard of the inboard trailing device, and can be movable relative to the wing between a second stowed position and a second deployed position along a second motionpath that is non-parallel to the first motion path. The system can still further include an intermediate trailing edge device coupled to the wing between the inboard and outbaord trailing edge devices. The intermediate trailing edge device can be movable relative to the wing between a third stowed position and a third deployed position along a third motion path that is non-parallel to both the first and second motion paths. Each of the inboard, outboard and intermediate trailing edge devices can open a gap relative to the wing when moved to their respective deployed positions.

In further particular aspects, the inboard trailing edge device has a first leading edge, the outboard trailing edge device has a second leading edge, and the intermediate trailing edge device has a third leading edge. The first, second and third leading edges can be offset from each other when the trailing edge devices are in their stowed positions. Each of the trailing edge devices can be moved to multiple deployed positions, and for at least one combination of deployed positions, the first, second and third leading edges can form a composite leading edge profile that follows a generally monotonic function.

Further aspects of the invention are directed to a method for operating an aircraft wing, including moving an inboard trailing edge device relative to an aircraft wing between a first stowed position and a first deployed position along a first motion path to open a gap between the inboard trailing edge device and the wing. The method can further include moving an outboard trailing edge device relative to the wing between a second stowed position and a second deployed positional-ong a second motion path that is non-parallel to the first motion path to open a gap between the outboard trailing edge device and the wing. The method can still further include moving an intermediate trailing edge device (located between the inboard and outboard trailing edge devices) relative to the wing between a third stowed position and a third deployed position along a third motion path that is non-parallel to the first and second motion paths to open a gap between the intermediate trailing edge device and the wing.

In a further particular aspect, moving the trailing edge devices can include moving the trailing edge devices along motion paths that converge toward each other in an aft direction. In still a further aspect, the itermediate trailing edge device can have a greater sweep angle than the inboard trailing edge device, and the outboard trailing edge device can have a greater sweep angle than the intermediate trailing edge device. The method can further include offsetting the leading edges of the trailing edge devices from each other when the trailing edge devices are in their stowed positions, aligning the leading edges to form a generally continuous leading edge when the trailing edge devices are in their deployed positions, in addition to affsetting the trailing edges of the trailing edge devices when the trailing edge devices are in their deployed positions, and aligning the trailing edges to form a composite trailing edge profile that follows a generally monotonic function when the trailing edge devices are in their stowed position.

DETAILED DESCRIPTION

The present disclosure describes aircraft trailing edge devices, including devices with non-parallel motion paths, and associated methods. Several specific details of the invention are set forth in the following description and in FIGS. 2-6C to provide a thorough understanding of certain embodiments of the invention. One skilled in the relevant art, however, will understand that the present invention may have additional embodiments, and that other embodiments of the invention may be practiced without several of the specific features described below.

Figure 1A:
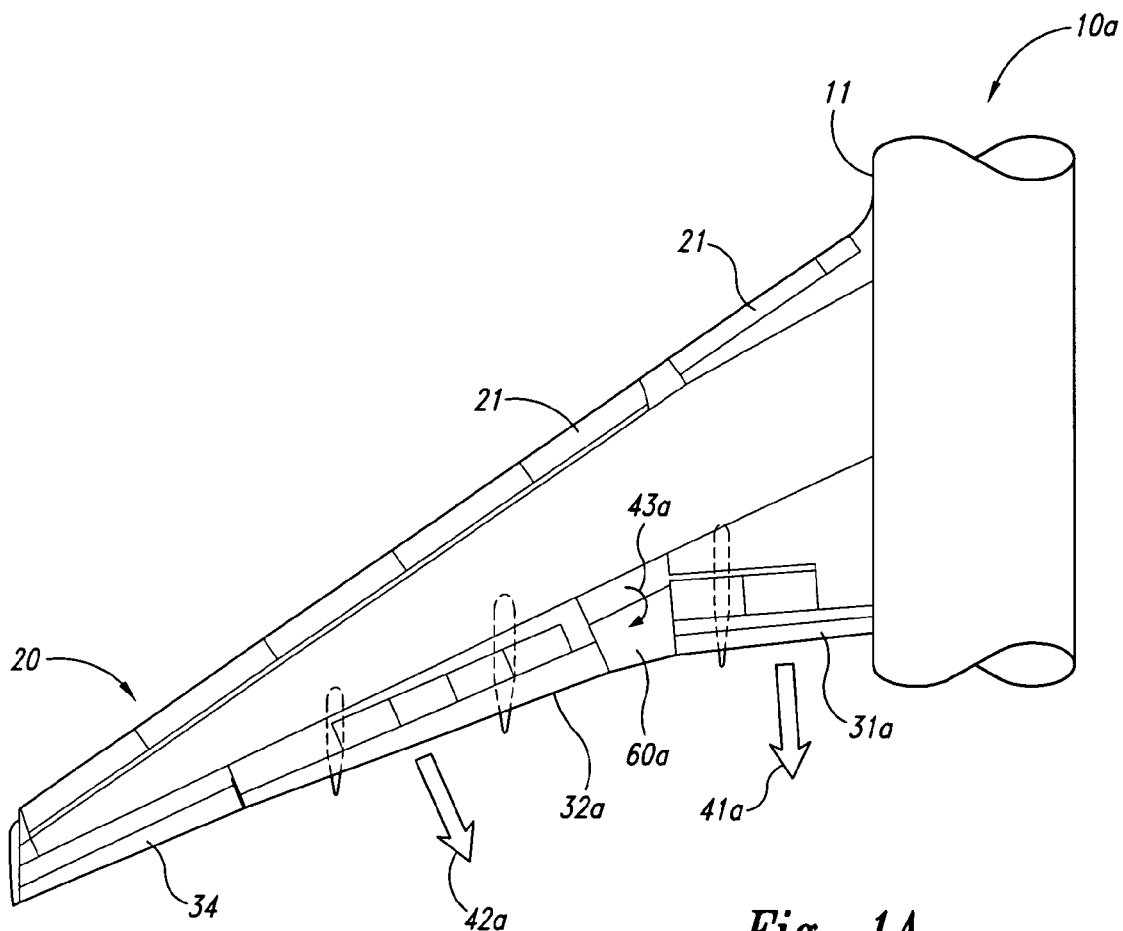
FIGS. 1A-1C illustrate aircraft wings configured in accordance with the prior art.
Figure 1B:
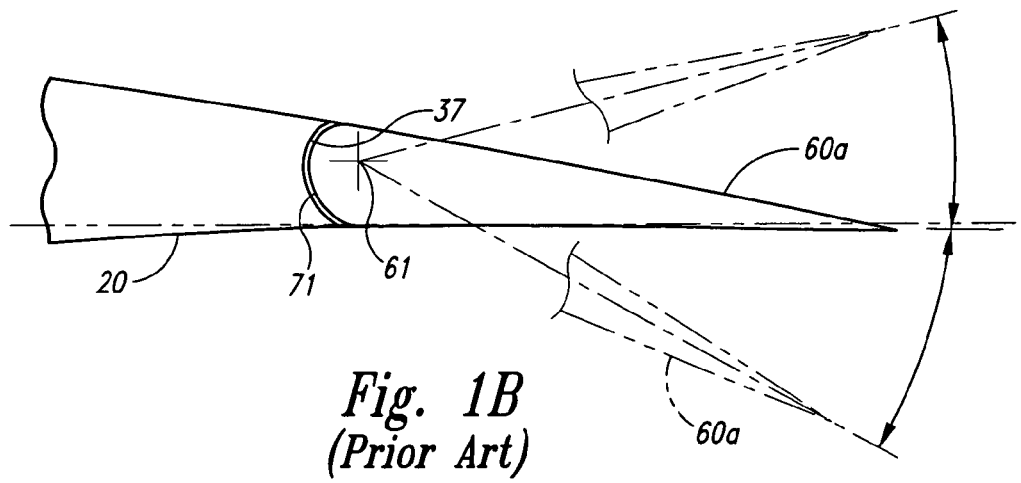
Figure 1C:
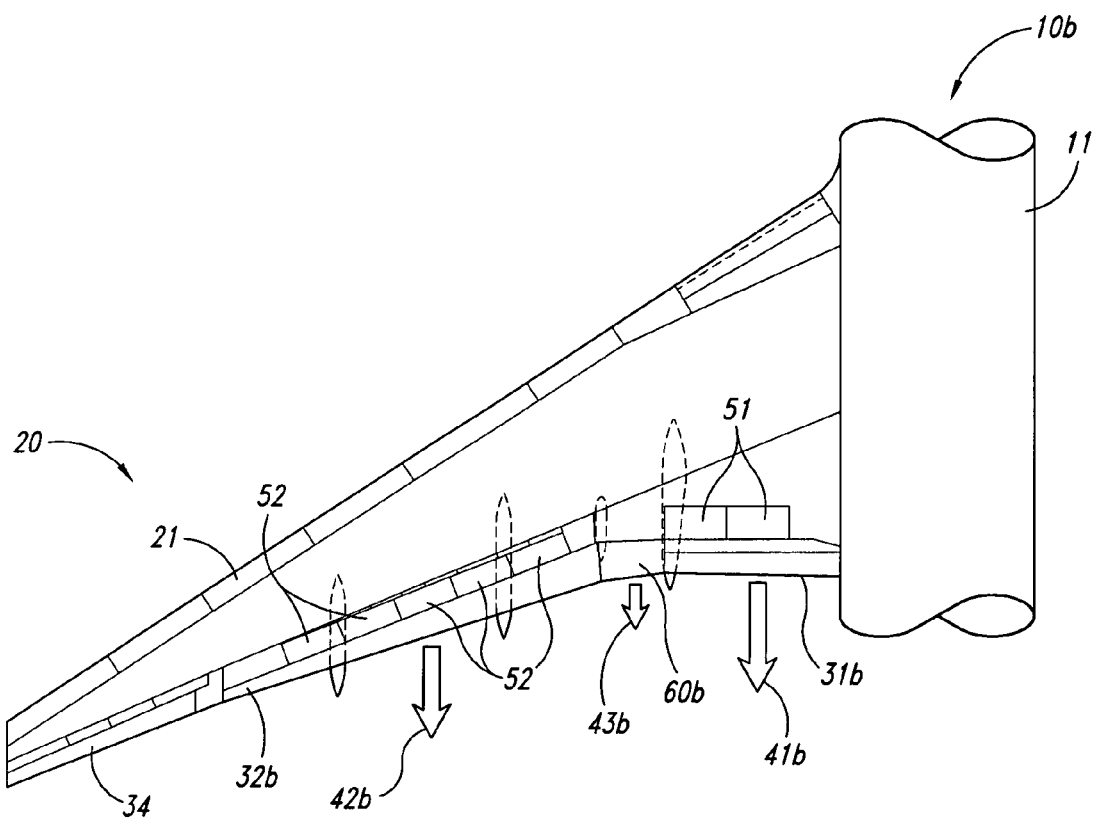
Figure 2:
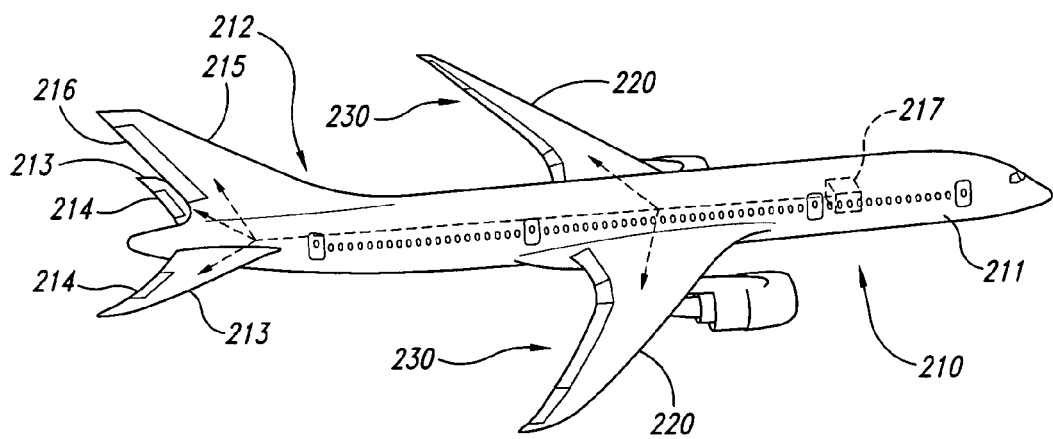
FIG. 2 is an isometric illustration of an aircraft having a wing with trailing edge devices configured in accordance with an embodiment of the invention.

FIG. 2 is a partially schematic, isometric illustration of an aircraft 210 having a fuselage 211 and wings 220 outfitted with trailing edge devices 230 configured in accordance with an embodiment of the invention. The aircraft 210 can further iclude an empennage 212 that carries horizontal stabilizers 213 and a vertical stabilizer 215. The horizontal stabilizers 213 can carry elevators 214, and the vertical stabilizer 215 can carry a rudder 216. The aircraft 210 can be controlled by activating the trailing edge devices 230, the elevators 214, and the rudder 216 under the direction of a control system 217 (shown schematically in FIG. 2). Further details of the trailing edge devices 230 are described below with reference to FIGS. 3-6C.

Figure 3:
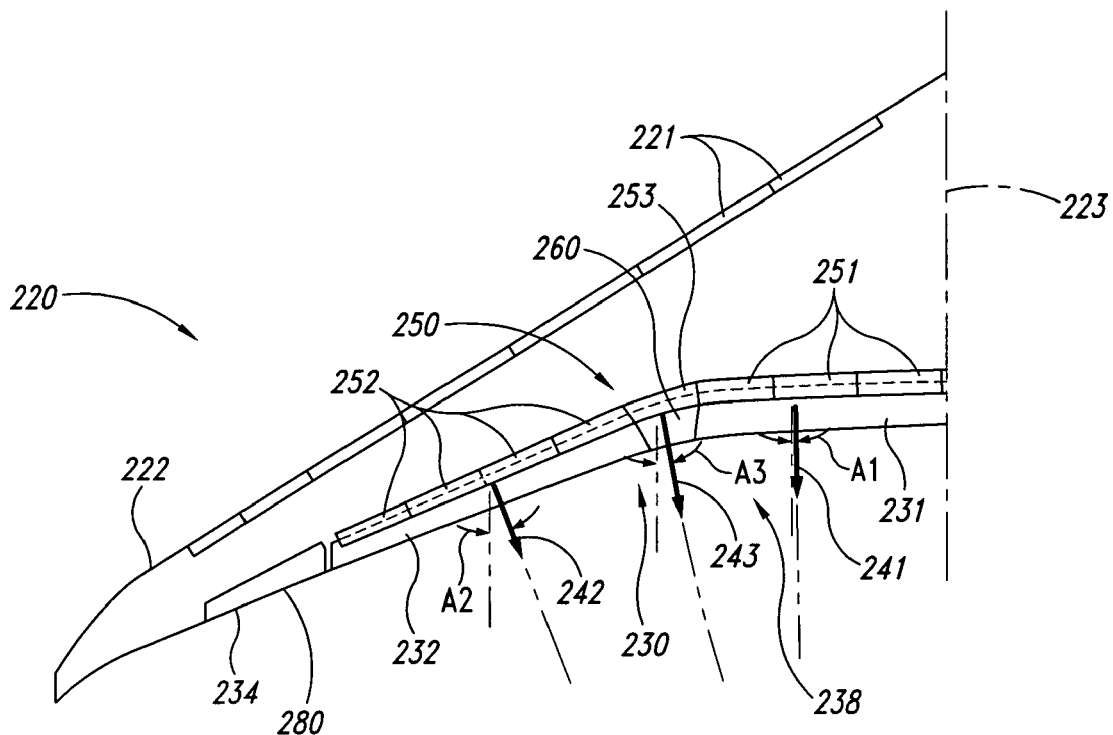
FIG. 3 is an enlarged, top plan view of one of wings shown in FIG. 2.

FIG. 3 is a top plan view of the left wing 220 of the aircraft 210 initially described above with reference to FIG. 2. The wing 220 can include deployable leading edge devices, such as slats 221, located at or proximate to a leading edge 222 of the wing 220. The trailing edge devices 230 are located aft of the leading edge 222 and form a composite trailing edge 280. The trailing edge devices 230 can include an aileron 234 positioned toward the outboard extremity of the wing 220, an inboard trailing edge device 231 (e.g., an inboard flap) positioned toward the inboard extremity of the wing 220, an outboard trailing edge device 232 (e.g., an outboard flap), and an intermediate trailing edge device 260 (e.g., a flaperon) positioned between the inboard and outboard trailing edge devices 231, 232. Each of the trailing edge devices 230 can be moved relative to the wing 220 between a stowed position (shown in FIG. 3) and one or more deployed positions. In one aspect of this embodiment, the aileron 234 does not form a gap relative to the wing 220 when the aileron 234 is deployed, while the inboard, outboard and intermediate trailing edge devices (collectively referred to as "gapped trailing edge devices 238") are described in greater detail below.

The inboard trailing edge device 231 can move along a first motion path 241, the outboard trailing edge device 232 can move along a second motion path 242, and the intermediate trailing edge device 260 can move along a third motion path 243. Each motion path may be purely rotational when viewed from the side of the aircraft 210, or may be a combination of rotation and translation. In either case, components of each motion path carry the corresponding gapped trailing device 238 aft and downward relative to the wing 220, thereby opening a gap between the wing 220 and the trailing edge device 238. The first motion path 241 can be oriented at a first angle A1 relative to the longitudinal axis 223 of the aircraft. In a particular aspect of an embodiment shown in FIG. 3, the first angle A1 can have a value of approximatley zero degrees. The second motion path 242 can be oriented at an angle A2 relative to the longitudinal axis 223, and the third motion path 243 can be oriented at an angle A3 that has a value between A1 and A2. Accordingly, the motion paths 241, 242, and 243 converge toward each other in an aft direction.

The wing 220 can further include spoilers 250 positioned proximate to the gapped trailing edge devices 238. The spoilers 250 can include outboard spoilers 252, inboard spoilers 251, and an intermediate spoiler 253. The spoilers 250 can be deployed in concert with the gapped trailing edge devices 238 to provide for further control of the airflow adjacent to the trailing edge gaps. The spoilers 250 can also be deployed independently of the motion of the gapped trailing edge devices 238, for example, to provide a speed brake function. In a particular aspect of this embodiment, each of the spoilers 250 is a simple hinged device that rotates downwardly and upwardly relative to the wing 220 (e.g., in the manner of standard aileron). Downward rotation can be accompllished without opening an additional gap relative to the wing 220, and upward rotation may create a small gap. The trailing edges of the spoilers 250 can be aligned to form a generally monotonic profile both when the spoilers 250 are in their stowed positions (as shown in FIG. 3) and also when the spoilers 250 are deployed downwardly.

Figure 4A:
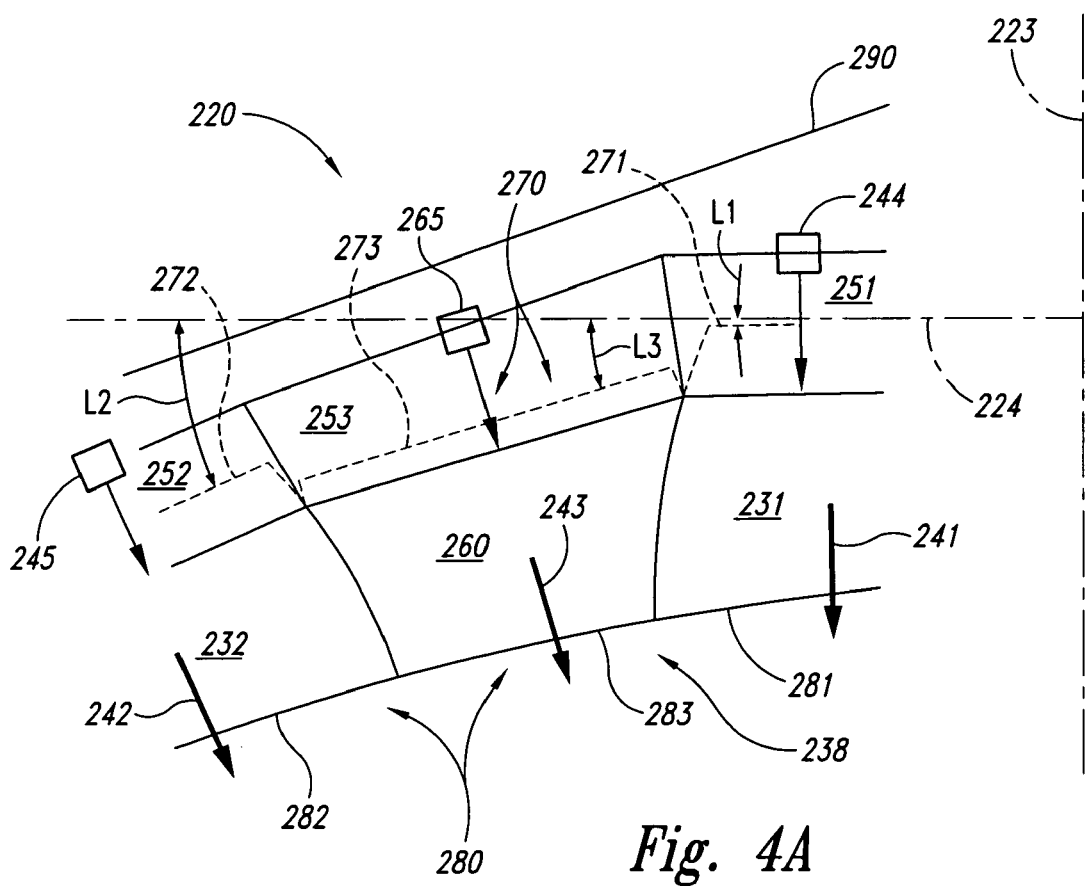
FIG. 4A is an enlarged plan view of a portion of the wing shown in FIG. 3.

FIG. 4A is a top plan view of a portion of the wing 220 shown in FIG. 3, approximately centered on the intermediate trailing edge device 260. The wing 220 can include a rear spar 290, with the wing fuel volume located forward of the rear spar 290, and the gapped trailing edge devices 238 located aft of the rear spar 290. Each of the gapped trailing edge devices 238 can include at least one actuator for moving the trailing edge devices between their stowed and deployed positions. Accordingly, the inboard trailing edge device 231 can be coupled to an inboard actuator 244. The outboard trailing edge device 232 can be coupled to an outboard actuator 245, and the intermediate trailing edge device 260 can be coupled to an intermediate actuator 265. For purposes of illustration, a single actuator is shown coupled to each of the gapped trailing edge devices 238, but it will be understood by those of ordinary skill in the relevant art that each device 238 may be coupled to a multiple actuators in other embodiments. In any of these embodiments, if the inermediate trailing edge device 260 is used for roll control (in addition to low-speed lift augmentation), while the inboard and outboard trailing edge edvices 231, 232 are used generally only for low-speed lift augmentation, then the intermediate actuator 265 can have a higher maximum actuation rate than that of the inboard actuator 244 and/or the ourboard actuator 245. Accordingly, the intermediate actuator 265 can provide response times appropriate for performing aileron functions.

Each of the gapped trailing edge devices 238 can include a leading edge positioned close to the wing 220, and a distal trailing edge. Accordingly, the inboard trailing edge device 231 can include a first leading edge 271 and a first trailing edge 281. The outboard trailing edge device 232 can include a second leading edge 272 and a second trailing edge 282. The intermediate trailing edge device 260 can include a third leading edge 273 and a third trailing edge 283. The leading edges 271, 272 and 273 can form a composite device leading edge 270, and the trailing edges 281, 282 and 283 can form the composite trailing edge 280. In a particular aspect of this embodiment, each ot the gapped trailing edge devices 238 can undergo purely rotational motion by rotating about a hinge line that is generally parallel to the corresponding leading edge. Accordingly, the first motion path 241 can be generally normal to the first leading edge 271, the second motion path 242 can be generally normal to the second leading edge 272, and the third motion path 243 can be generally normal to the third leading edge 273.

When the gapped trailing edge devices 238 are in their stowed positions (as shown in FIG. 4A), the corresponding trailing edges 281, 282, 283 can form a generally continuous composite trailing edge 280 that defines a monotonically varying function. In this configuration, the leading edges 271, 272, and 273 can be located beneath the corresponding spoilers 251, 252 and 253, respectively, as indicated by dashed lines in FIG. 4A. The leading edges 271, 272, 273 can each be swept by successively greater angles (in a spanwise direction) relative to a lateral axis 224 of the wing 220. Accordingly, the first leading edge 271 can be swept by an angle L1, the second leading edge 272 can be swept by an angle L2, and the third leading edge 273 can be swept by an angle L3 that is between L1 and L2. As is also shown in FIG. 4A, the first, second and third leading edges 271, 272, and 273 can be stepped relative to each other when the gapped trailing edge devices 238 are in their stowed positions. This is not expected to have an adverse aerodynamic consequence because the leading edges are positioned beneath the corresponding spoilers when the gapped trailing edge devices 238 are in their stowed postions.

Figure 4B:
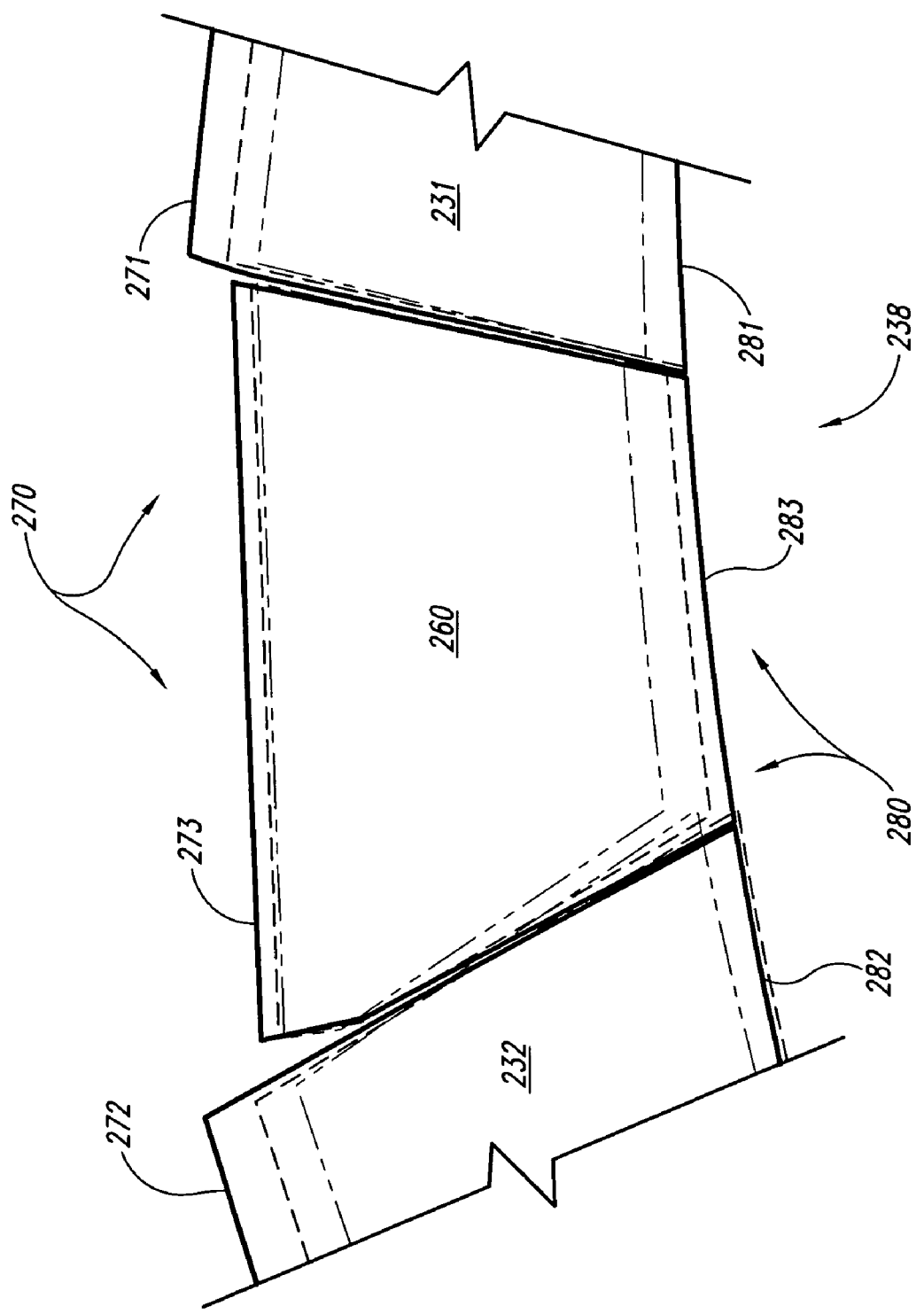
FIG. 4B illustrates trailing edge devices of the wing shown in FIG. 4A at stowed and deployed positions.

FIG. 4B is an enlarged, schematic illustration of the portion of the wing 220 shown in FIG. 4A, with the gapped trailing edge devices 238 shown in stowed and selected deployed positions. The general outlines of the gapped devices 238 are shown in solid lines when the devices are stowed, dashed lines when the devices are partially deployed (corresponding to a take-off setting), and phantom lines when the devices are fully deployed (corresponding to a landing setting). As described above, when the gapped devices 238 are in the stowed positions, the trailing edges 281, 282, and 283 form a composite trailing edge 280 that has a generally monotonically varying function. Although there may be small spaces between the sides of adjacent devices 238, the overall composite trailing edge 280 does not include significant steps. Conversely, the composite leading edge 270 (formed by the first leading edge 271, the second leading edge 272, and the third leading edge 273) is stepped and does not form a generally monotonically varying function. As the gapped trailing edge devices 238 move from their stowed positions to their deployed positions, the composite trailing edge 280 becomes more stepped, and the composite leading edge 270 becomes less stepped. For example, as shown by dashed lines in FIG. 4B, when the gapped trailing edges 238 are in a partially deployed position (indicated by dashed lines), the leading edges 271, 272, and 273 are more closely aligned with each other, while the trailing edges 281, 282, and 283 depart from a generally monotonically varying composite trailing edge 280. When the gapped trailing edge devices 238 move to their fully deployed positions (as indicated by phantom lines in FIG. 4B), the composite leading edge 270 can describe a generally monotonically varying function, while the composite trailing edge 280 is stepped. Accordingly, while spaces may exist between the edges of adjacent gapped trailing edge devices 238 at the composite leading edge 270, the overall contour of the composite leading edge 270 is generally monotonic and unstepped.

One feature of an arrangement of the gapped trailing edge devices 238 in accordance with several embodiments of the invention is that all three of the devices 238 can form aerodynamic gaps when moved to their deployed positions. An advantage of this arrangement is that the devices 238 can be deployed to greater deflection angles than would be possible if the devices were not gapped, which can in turn provide for greater aircraft control and reduced aircraft landing speeds.

Another feature of at least some of the foregoing embodiments is that they can include an intermediate, gapped trailing edge device 260 that has a generally trapezoidal planform shape and that is positioned between tow additional gapped trailing edge devices 231, 232. The trapezoidal shape can allow the intermediate trailing edge device 260 to be fit between an inboard trailing edge device 231 located at a portion of the wing 220 that has little or no sweep, and an outboard trailing edge 232 device located at a portion of the wing 220 that has a significant sweep angle. In addition, the intremediate trailing edge device 260 can move aft relative to the wing 220 along a motion path that is aligned between the motion paths of the inboard and outboard trailing edge devices 231, 232. This arrangement allows the intermediate trailing edge device 260 to mobe downwardly and in come case, aft (by at least a short distance), without interfering with the inboard and outboard trailing edge devices 231,232, which are also moving aft. As a result, the intermediate trailing edge device 260 can form a gap relative to the wing 220, which increases its effectiveness at high deflection angles without causing interference with the adjacent devices. The overall effect of this arrangement is that it can make increased use of the trailing edge devices 238 when compared with existing trailing edge device arrangement.

Still another feature of at least some embodiments of the foregoing arrangements is that they can include trailing edge devices having the forward 20% (or less) covered by spoilers or other portions of the wing when the trailing edge devices are stowed. An advantage of this arrangement is that it can require less aftward movement to open a suitable gap between the wing and the trailing edge device when the trailing edge device is deployed.

Figure 5A:
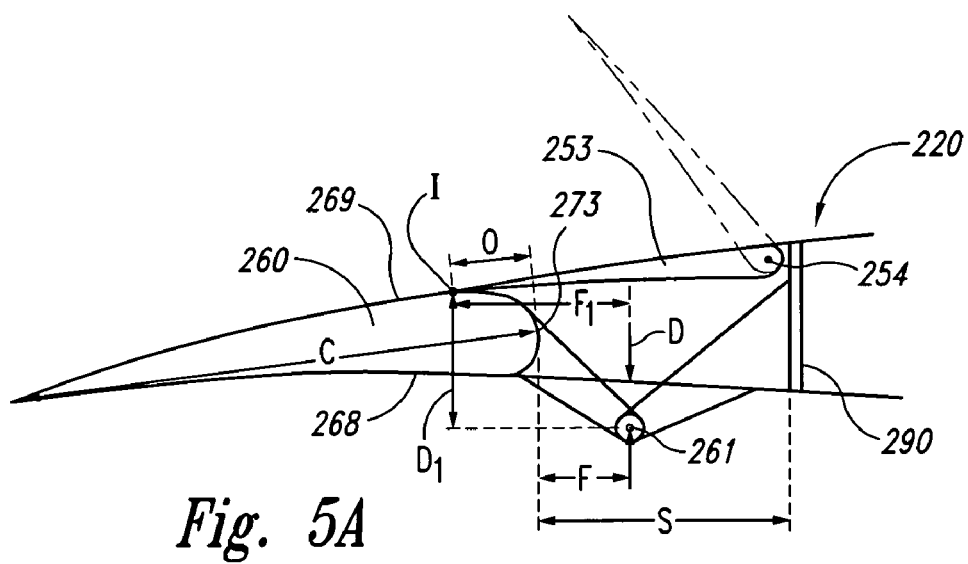
FIGS. 5A-5C are schematic side illustrations of an intermediate trailing edge device in stowed and deflected positions in accordance with an embodiment of the invention.
Figure 5B:
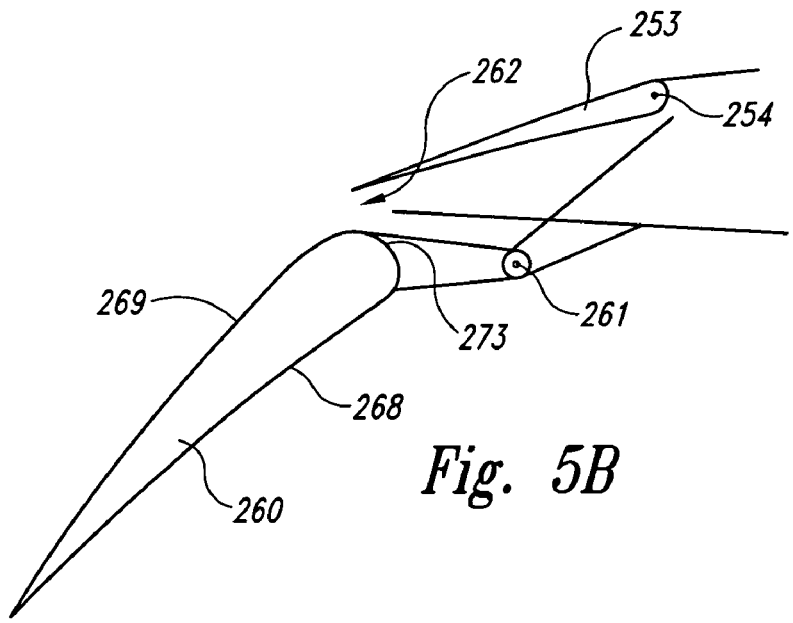
Figure 5C:
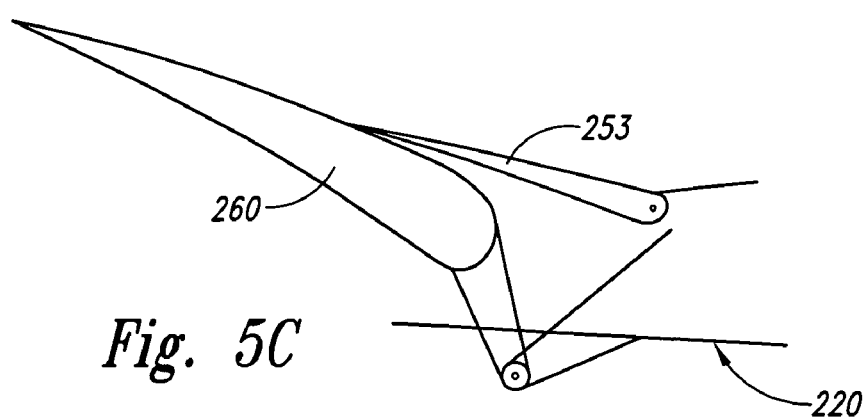

FIGS. 5A-5C schematically illustrate the intermediate trailing edge device 260, including features that can increase the ease with which the trailing edge device 260 is intergrated with the adjacent trailing edge devices 231, 232 described above. Referring first to FIG. 5A, the intermediate trailing edge device 260 can have a hinge point 261 that is located forward of the third leading edge 273 by a distance F. The hinge point 261 can also be located below both an upper surface 269 and a lower surface 268 of the intermediate trailing edge device 260. In a particular embodiment, the hinge point 261 is located a distance D below the lower surface 268. In other embodiments, the location of the hinge point 261 can be identified with reference to an intersection point I between a portion of the wing 220 and the upper surface 269 of the intermediate trailing edge device 260. In an embodiment shown in FIG. 5A, the intersection point I can be at the aft-most point of the intermediate spoiler 253, and in other embodiments (e.g., those in which the wing 220 does not include a spoilet at this location), the intersection point I can be at another portion of the wing 220. In any of these embodiments, the hinge point 261 can be located a distance D1 beneath the intersection point I, and a distance F1 forward of the intersection point I.

By locating the hinge point 261 forward of the leading edge 273 (and/or the intersection point I), and at a relatively shallow depth D (or D1) below the intermediate trailing edge device 260, the motion of the intermediate trailing edge device 260 when it deploys can be less likely to interfere with the motion of adjacent trailing edge devices. In particular, this arrangement can allow a significant portion of the movement of the intermediate trailing edge device 260 to be downward (in addition to being aftward) when it is deployed (as shown in FIG. 5B). For example, in this arrangement, the leading edge 273 of the intermediate trailing edge device 260 can move downwardly by a significant margin as a result of the hinge point 261 being positioned forward relative to the leading edge 273. This is unlike many existing trailing edge devices which have hinge points located at or behind the leading edge. An advantage of this arrangement is that the intermediate trailing edge device 260 can form an aerodynamically significant gap 262 while moving along an intermediate flap motion path 243 (shown in FIG. 3) that does not interfere with the motion of adjacent trailing edge devices.

The surfaces of the intermediate trailing edge device 260 (e.g., the lower surface 268 and the upper surface 269) can be generally rigid in at least one embodiment, and accordingly do not change shape significantly when the intermediate trailing edge device 260 is deployed. This is unlike some other trailing edge devices that change shape during deployment. In one aspect of this embodiment the position of the hing point 261 can allow the intermediate trailing edge device 260 to open the gap 262 when deployed, without the need for flexible flow surfaces.

The size of the gap 262 can be controlled at least in part by the intermediate spoiler 253. The intermediate spoiler 253 can rotate about a spoiler hinge point 254, and can follow (at least in part) the motion of the trailing edge device 260 when the trailing edge device 260 is deflected upwardly (as shown in FIG. 5B). When the trailing edge device 260 is deflected upwardly (as shown in FIG. 5C), the spoiler 253 can also follow this motion in such a manner as to eliminate or nearly eliminate the gap 262. Accordingly, the spoiler 253 can follow a motion path that nearly seals it against the trailing edge device 260. In other embodiments, such rubbing can be permitted so long as it does not damage either the spoiler 253 or the trailing edge device 260. This arrangement can allow the trailing edge device 260 to be deflected upwardly for roll control and/or wing load alleviation. The intermediate spoiler 253 can also be operated independently of the trailing edge device 260 (as shown in dashed lines in FIG. 5A), to act as a spoiler and/or speed brake. In particular embodiments, the trailing edge device 260 can be deflected upwardly by at least 10° relative to the stowed position, and in further particular embodiment, the trailing edge device 260 can be deflected upwardly by up to 30°.

Figure 5D:
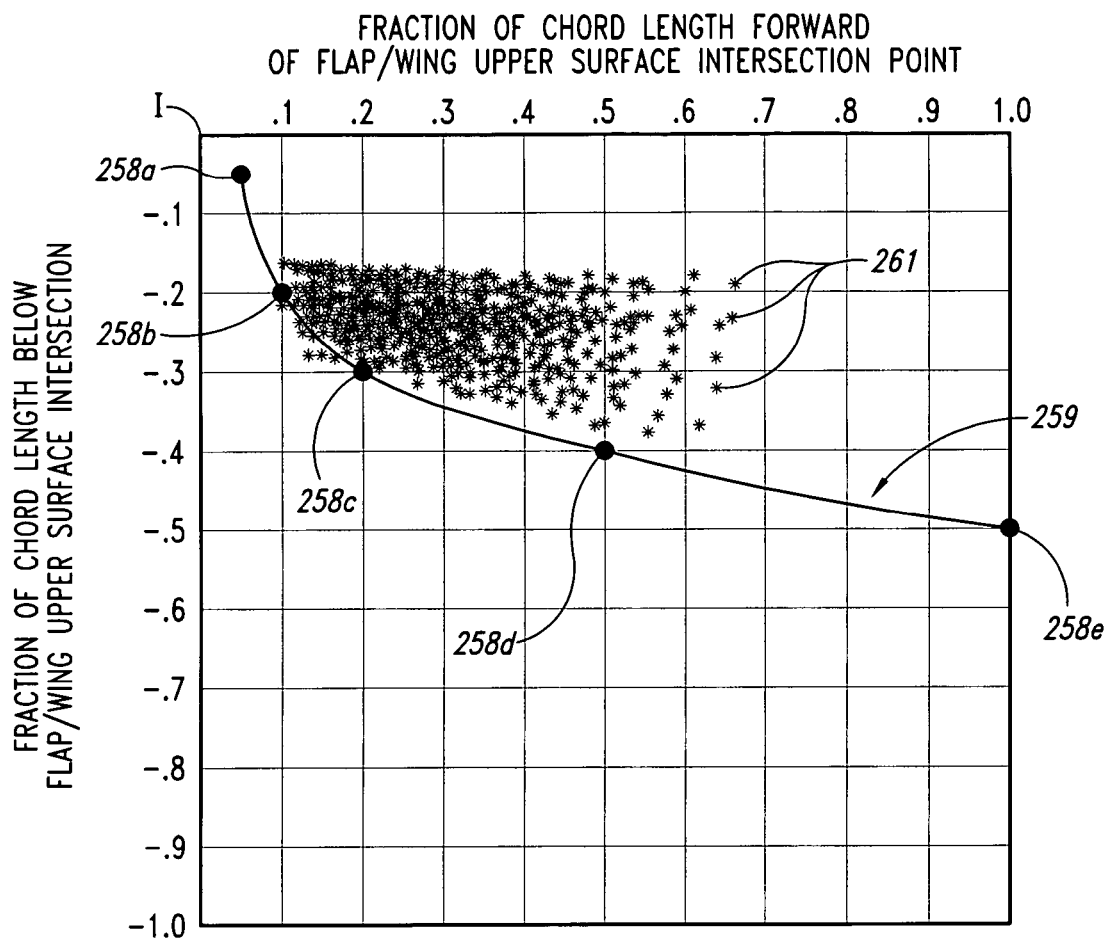
FIG. 5D is a graph illustrating hinge point locations, nondimensionalized by trailing edge device chord length, and located relative to an intersection between the wing and the trailing edge device in accordance with several embodiments of the invention.

In particular embodiments, the distances F1 and D1 described above with reference to FIG. 5A can have specific ranges of values, when non-dimensionalized relative to each other and/or relative to the chord length C of the intermediate trailing edge device 260. For example, FIG. 5D illustrates representative hinge points 261 plotted on a non-dimensionalized grid. Point I (the origin) identified the intersection point between the wing 220 and the upper surface 269 of the intermediate trailing edge device 260. The x-scale identifies the fore/aft location of the hinge points 261, non-dimensionalized by the chord length C of the intermediate trailing edge device 260. The y-scale identifies the upward/downward location of the hinge points 261, also non-dimensionalized by the chord length C. Hinge points 261 in accordance with particular aspects of the invention are located forward of and above a series of line segments passing through x, y coordinates (0.5, −0.5), (0.1 −0.2), (0.2, −0.3), (0.5 −0.4) and (1.0, −0.5) identified as points 258a-258e, respectively.

Returning to FIG. 5A, the rear spar 290 can be positioned relatively far forward of the intermediate trailing edge device 260. For example, the rear spar 290 can be positioned a distance S forward of the third leading edge 273. A ratio of S to local streamwise chord length C can have a value of about 0.5. In some cases, this ratio can be higher as well. While this ratio can apply to the intermediate trailing edge device 260 (and in particular, the outboard trailing edge device 260), it can also apply to the outboard trailing edge device 232 shown in FIG. 3, at any point along the span of that device.

The foregoing ratio (e.g., as applied to the outboard trailing edge device 232) is unlike many existing arrangements in which the ratio of S/C varies from about 0.2 to about 0.32. An advantage of an embodiment of the arrangement shown in FIG. 5A is that it can accomodate a forward location of the hinge point 261 (and associated actuation mechanisms) without significantly inpacting overall fuel volume. This in turn can improve the intergration of the outboard trailing edge device 232.

Figure 6A:
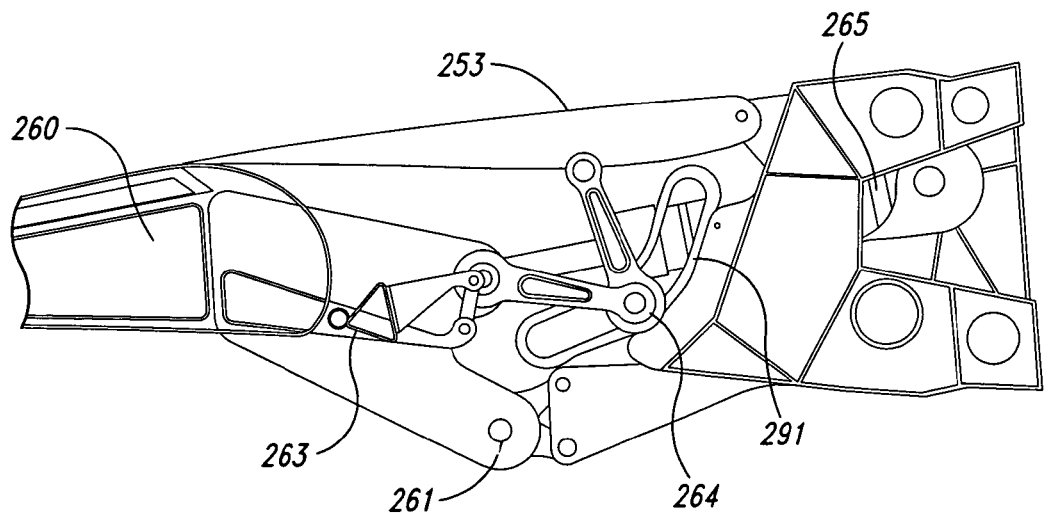
FIGS. 6A-6C are partially schematic, side elevation views of the intermediate trailing edge device shown in FIGS. 4A-4C, illustrating further features of this device.
Figure 6B:
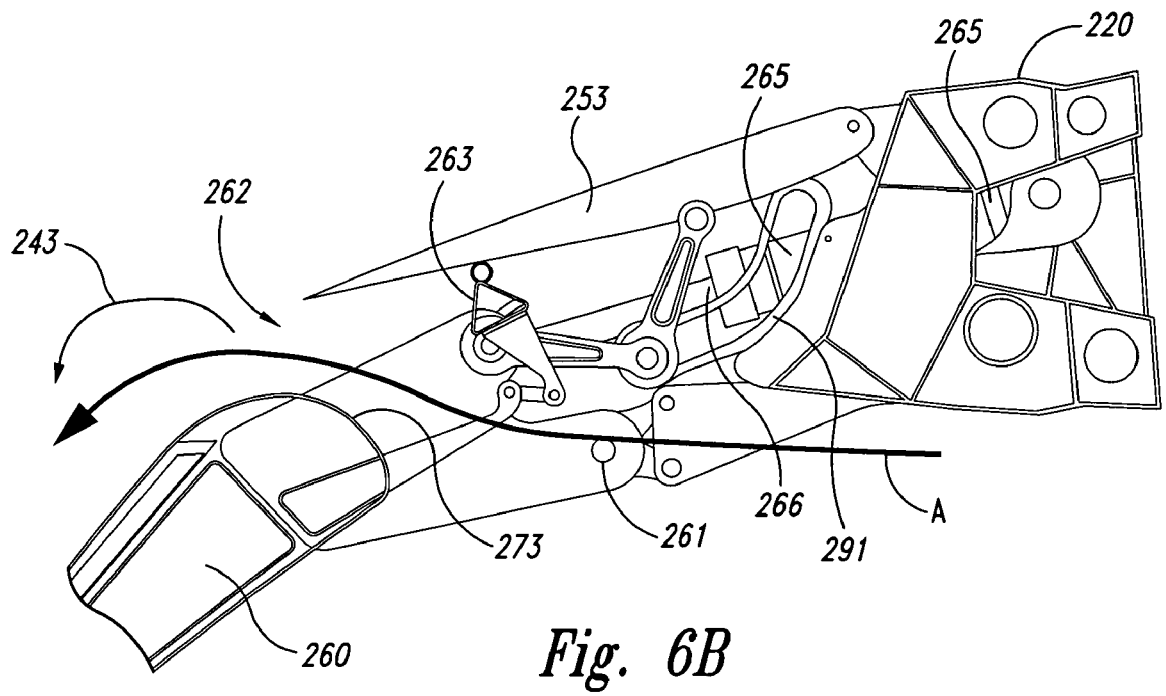
Figure 6C:
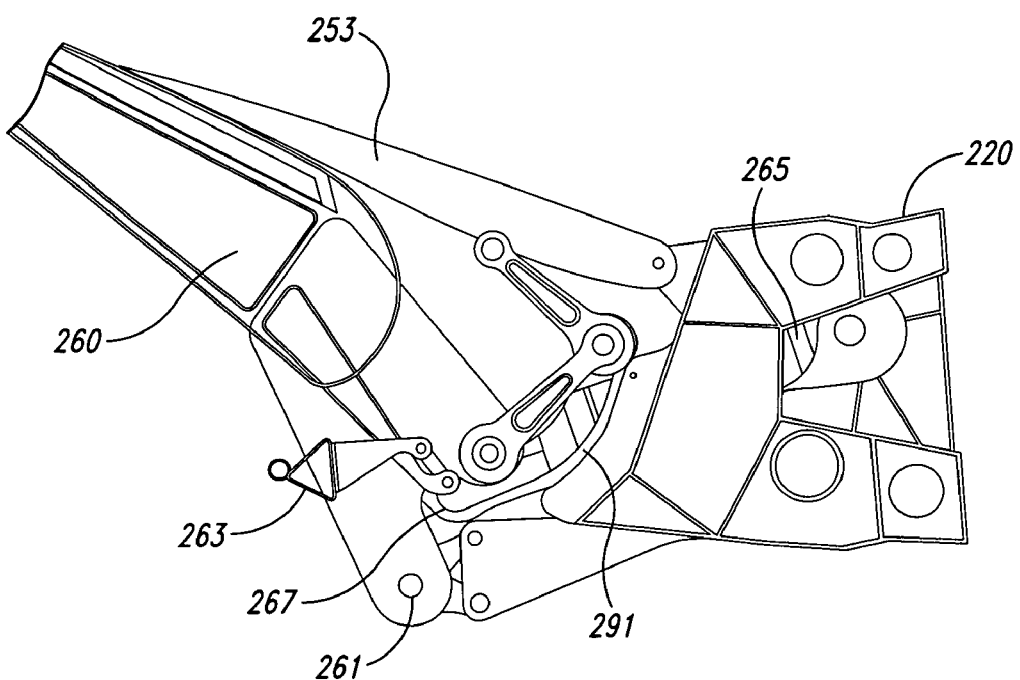

FIGS. 6A-6C illustrate further details of the operation of the intermediate trailing edge device 260. FIG. 6A illustrates the intermediate trailing edge device 260 in its stowed position. In addition to the components described above, the aircraft wing 220 can include a lower cove door 263 that controls airflow along the lower surface of the trailing edge device 260. As shown in FIG. 6B, the intermediate trailing edge device 260 has been moved to a lower deployed position to open the gap 262 between the leading edge 273 and the wing 220. Accordingly, the actuator 265 drives an actuator link 266 aft to move the intermediate trailing edge device 260 along it notion path 243. The lower cove door 263 can be mechanically linked to the coupling between the actuator 265 and the intermediate trailing edge device 260 to rotate out of the way and open the gap 262, allowing air (indicated by arrow A) to flow through. THe intermediate spoiler 253 can also by mechanically linked to the motion of the intermediate trailing edge device 260 to rotate downwardly and control the size of the gap 262. In other embodiments, the motion of the lower cove door 263 and/or the intermediate spoiler 253 can be controlled in other fashions, for example, by an independent hydraulic or electric control system. FIG. 6C illustrates the intermediate trailing edge device 260 and the intermediate spoiler 253 deflected upwardly, for example, while performing a roll control or wing load alleviation function. As is also shown in FIG. 6C, making the depth of the hinge 261 relatively shallow can reduce or eliminate the need for a large or otherwise extensive fairing at the lower surface of the wing 220. The combination of a gapped trailing edge device with a drooped spoiler can implrove both the aerodynamic performance of the high lift system and the wing in which it is installed.

In a particular embodiment, the arrangement shown in FIGS. 6A-6C can include a cam track 291 and associated linkage that attach the intermediate spoiler 253 to the intermediate trailing edge device 260, controlling the gap 262 between the two devices. By tailoring the contour of the cam surfaces of the cam track 291, the position of the intermediate spoiler 253 relative to the intermediate trailing edge device 260 (including the gap 262) can be specified with a high degree of accuracy throughout the entire range of motion. The cam track 291 can add specific advantages over other embodiments, such as hydraulic or electric actuators, or a bellcrank mechanism. For example, actuators (hydraulic or electric) may be heavier, and/or more costly, than the cam track 291. A bell crank, though similar in weight an reliability to the cam track 291, typically does not match the flexibility and adaptability of the cam track 291 to manage the gap 262. In a particular aspect of an embodiment shown in FIGS. 6A-6C, the cam track 291 can improve the ability of the spoiler 253 to fair to the intermediate trailing edge device 260 in the retracted position. The cam track 291 can also aid in setting the gap 262 at a certain value for given down positions of the intermediate trailing edge device 260 (e.g., a takeoff positon and a landing position). The cam track 291 can also provide control for specific movement patterns. For example, when the intermediate trailing edge device 260 moves down from the cruise (retracted) position, the cam track 291 can be shaped so that the spoiler 253 "dwells," allowing the gap 262 to increase quickly as the intermediate trailing edge device 260 moves down. Similarly, as the intermediate trailing edge device 260 moves up from the cruise (retracted) position, the spoiler 253 can quickly move upwards, to clear the rising intermediate trailing edge device 260.

From the foregoing, it will be appreciated that specific embodiments of the invention have been described herein for purposes of illustration, but that various modifications may be made without deviating from the invention. For example, in some embodiments, the intermediate trailing edge device can be installed between inboard and outboard trailing edge devices and can have a gapped deployed configuration that is driven by arrangements other than those shown in the Figures. The trailing edge devices, including the intermediate trailing edge device, can be deployed to control a spanwise lify distribution over the wing. Motion of the trailing edge devices in several embodiments includes rotational motion. In at least some embodiments, the motion of the trailing edge devices can also include other motions (e.g., linear motions). Aspects of the invention described in context of particular embodiments may be combined or eliminated in other embodiments. For example, aspects of the invention described in the context of three gapped trailing edge devices can be extended to a greater number of gapped trailing edge devices in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claim.

We claim:

1. An aircraft system, comprising:
a wing;
an inboard trailing edge device coupled to the wing and movable relative to the wing between a first stowed position and a first deployed position along a first motion path, wherein an airflow gap exists between the inboard trailing edge device and the wing when the inboard trailing edge device is in the first deployed position;
an outboard trailing edge device coupled to the wing outboard of the inboard trailing edge device, and being movable relative to the wing between a second stowed position and a second deployed position along a second motion path that is non-parallel to the first motion path, wherein an airflow gap exists between the outboard trailing edge device and the wing when the outboard trailing edge device is in the second deployed position; and
an intermediate trailing edge device coupled to the wing between the inboard and outboard trailing edge devices, and being movable relative to the wing between a third stowed position and a third deployed position along a third motion path that is non-parallel to both the first and second motion paths, wherein an airflow gap exists between the intermediate trailing edge device and the wing when the intermediate trailing edge device is in the second deployed position, and wherein the wing does not include fixed upwardly facing external surfaces (a) between the inboard trailing edge device and the intermediate trailing edge device, and (b) between the intermediate trailing edge device and the outboard trailing edge device.

2. The aircraft system of claim 1 wherein:
the inboard trailing edge device has a first leading edge, the outboard trailing edge device has a second leading edge and the intermediate trailing edge device has a third leading edge;
the first, second and third leading edges are offset from each other when the trailing edge devices are in their stowed positions;
the first deployed position is one of multiple first deployed positions, the second deployed position is one of multiple second deployed positions, and the third deployed position is one of multiple third deployed positions; and
for at least one combination of a first deployed position, a second deployed position and a third deployed position, the first, second and third leading edges form a composite leading edge profile that follows a generally monotonic function.

3. The aircraft system of claim 1 wherein the first, second and third motion paths converge toward each other in an aft direction.

4. The aircraft system of claim 1 wherein intermediate trailing edge device has a generally trapezoidal planform shape.

5. The aircraft system of claim 1 wherein the inboard trailing edge device has a first leading edge, the outboard trailing edge device has a second leading edge and the intermediate trailing edge device has a third leading edge, and wherein the first, second and third leading edges are offset from each other when the trailing edge devices are in their stowed positions.

6. The aircraft system of claim 1 wherein the inboard trailing edge device has a first trailing edge, the outboard trailing edge device has a second trailing edge and the intermediate trailing edge device has a third trailing edge, and wherein the first, second and third trailing edges form a composite trailing edge profile that follows a generally monotonic function when the trailing edge devices are in their stowed positions.

7. The aircraft system of claim 1 wherein the wing has a longitudinal axis and wherein the inboard trailing edge device has a first leading edge with a first sweep angle relative to the longitudinal axis, the outboard trailing edge device has a second leading edge with a second sweep angle greater than the first sweep angle, and the intermediate trailing edge device has a third leading edge with a third sweep angle (a) greater than the first sweep angle and less than or equal to the second sweep angle, or (b) greater than or equal to the first sweep angle and less than the second sweep angle.

8. The aircraft system of claim 1 wherein the wing has a longitudinal axis and wherein the inboard trailing edge device has a first leading edge with a first sweep angle relative to the longitudinal axis, the outboard trailing edge device has a second leading edge with a second sweep angle, and wherein the inboard trailing edge device moves generally normal to the first leading edge and the outboard trailing edge device moves generally normal to the second leading edge.

9. The aircraft system of claim 1, further comprising:
an inboard spoiler positioned forward of the inboard trailing edge device;
an outboard spoiler positioned forward of the outboard trailing edge device; and
an intermediate spoiler positioned forward of the intermediate trailing edge device, wherein each of the spoilers is movable between a stowed position, a downwardly deflected position, and an upwardly deflected position.

10. The aircraft system of claim 9 wherein the wing has a longitudinal axis and wherein the inboard spoiler has a first hinge line with a first sweep angle relative to the longitudinal axis, the outboard spoiler has a second hinge line with a second sweep angle relative to the longitudinal axis, and the intermediate spoiler has a third hinge line with a third sweep angle relative to the longitudinal axis, and wherein the third sweep angle is greater than the first sweep angle and less than the second sweep angle.

11. The aircraft system of claim 9 wherein the inboard spoiler has a first trailing edge, the outboard spoiler has a second trailing edge, and the intermediate spoiler has a third trailing edge, and wherein the first, second and third trailing edges form a composite trailing edge profile that follows a generally monotonic function when the spoilers are in their stowed positions.

12. The aircraft system of claim 9 wherein the inboard spoiler has a first trailing edge, the outboard spoiler has a second trailing edge, and the intermediate spoiler has a third trailing edge, and wherein the first, second and third trailing edges form a generally continuous composite trailing edge when the spoilers are in their downwardly deflected positions.

13. The aircraft system of claim 9 wherein each of the spoilers is movable to multiple downwardly deflected positions, and wherein the inboard spoiler has a first trailing edge, the outboard spoiler has a second trailing edge, and the intermediate spoiler has a third trailing edge, and wherein the first, second and third trailing edges form a composite trailing edge profile that follows a generally monotonic function when the spoilers are moved in a coordinated fashion to any of their downwardly deflected positions.

14. The aircraft system of claim 1, further comprising a control system operatively coupled to the trailing edge devices to control motion of the trailing edge devices.

15. The aircraft system of claim 1 wherein the wing includes a wing fuel volume and wherein the outboard trailing edge device has a chord length and wherein the system further comprises a rear wing spar positioned aft of the wing fuel volume, and wherein the rear wing spar is located at a distance forward of the outboard trailing edge device, with a ratio of the distance to the chord length having a value of about 0.5 or higher.

16. An aircraft, comprising:
a fuselage having a longitudinal axis;
a wing coupled to the fuselage; and
an inboard trailing edge device coupled to the wing and movable relative to the wing between a first stowed position and a first deployed position along a first motion path, wherein an airflow gap exists between the inboard trailing edge device and the wing when the inboard trailing edge device is in the first deployed position, the inboard trailing edge device having (a) a first leading edge with a first sweep angle relative to the longitudinal axis, and (b) a first trailing edge;
an outboard trailing edge device coupled to the wing outboard of the inboard trailing edge device, and being movable relative to the wing between a second stowed position and a second deployed position along a second motion path that is non-parallel to the first motion path, wherein an airflow gap exists between the outboard trailing edge device and the wing when the outboard trailing edge device is in the second deployed position, the outboard trailing edge device having (a) a second leading edge with a second sweep angle relative to the longitudinal axis, and (b) a second trailing edge; and
an intermediate trailing edge device coupled to the wing between the inboard and outboard trailing edge devices, and being movable relative to the wing between a third stowed position and a third deployed position along a third motion path that is non-parallel to both the first and second motion paths, wherein an airflow gap exists between the intermediate trailing edge device and the wing when the intermediate trailing edge device is in the third deployed position, the intermediate trailing edge device having (a) a third leading edge with a third sweep angle relative to the longitudinal axis, the third sweep angle being greater than the first sweep angle and less than the second sweep angle, and (b) a third trailing edge; wherein
the first, second and third leading edges are offset from each other when the trailing edge devices are in their stowed positions;
the first, second and third leading edges form a generally monotonic leading edge profile when the trailing edge devices are in their deployed positions;
the first, second and third trailing edges are offset from each other when the trailing edge devices are in their deployed positions; and
the first, second and third trailing edges form a generally monotonic trailing edge profile when the trailing edge devices are in their deployed positions; and wherein the wing does not include fixed upwardly facing external surfaces (a) between the inboard trailing edge device and the intermediate trailing edge device, and (b) between the intermediate trailing edge device and the outboard trailing edge device.

17. The system of claim 16 wherein the first, second and third motion paths converge toward each other in an aft direction.

18. A method for operating an aircraft wing, comprising:
moving an inboard trailing edge device relative to an aircraft wing between a first stowed position and a first deployed position along a first motion path to open a gap between the inboard trailing edge device and the wing;
moving an outboard trailing edge device relative to the wing between a second stowed position and a second deployed position along a second motion path that is non-parallel to the first motion path to open a gap between the outboard trailing edge device and the wing; and
moving an intermediate trailing edge device relative to the wing between a third stowed position and a third deployed position along a third motion path that is non-parallel to the first and second motion paths to open a gap between the intermediate trailing edge device and the wing, wherein the intermediate trailing edge device is positioned between the inboard and outboard trailing edge devices, and wherein the wing does not include fixed upwardly facing external surfaces (a) between the inboard trailing edge device and the intermediate trailing edge device, and (b) between the intermediate trailing edge device and the outboard trailing edge device.

19. The method of claim 18 wherein moving the trailing edge devices includes moving the trailing edge devices along motion paths that converge toward each other in an aft direction.

20. The method of claim 18 wherein the inboard trailing edge device has a first trailing edge, and a first leading edge with a first sweep angle, the outboard trailing edge device has a second trailing edge, and a second leading edge with a second sweep angle greater than the first sweep angle, and the intermediate leading edge device has a third trailing edge, and a third leading edge with a third sweep angle greater than the first sweep angle and less than the second sweep angle, and wherein the method further comprises:
offsetting the first, second, and third leading edges from each other when the trailing edge devices are in their stowed positions;
aligning the first, second and third leading edges to form a generally monotonic leading edge profile when the trailing edge devices are in their deployed positions;
offsetting the first, second and third trailing edges when the trailing edge devices are in their deployed positions; and
aligning the first, second and third trailing edges form a generally monotonic composite trailing edge profile when the trailing edge devices are in their stowed positions.

21. The method of claim 18 wherein the inboard trailing edge device has a first leading edge, the outboard trailing edge device has a second leading edge and the intermediate trailing edge device has a third leading edge, and wherein stowing the trailing edge devices includes positioning the first, second and third leading edges to be offset from each other.

22. The method of claim 18 wherein:
the first deployed position is one of multiple first deployed positions, the second deployed position is one of multiple second deployed positions, and the third deployed position is one of multiple third deployed positions; and wherein
moving the trailing edge devices includes moving the trailing edge devices to at least one combination of a first deployed position, a second deployed position and a third deployed position where the first, second and third leading edges form a generally continuous composite leading edge.

23. The method of claim 18 wherein the inboard trailing edge device has a first trailing edge, the outboard trailing edge device has a second trailing edge and the intermediate trailing edge device has a third trailing edge, and wherein moving the trailing edge devices includes moving the first, second and third trailing edges to form a composite trailing edge profile that follows a generally monotonic function when the trailing edge devices are their stowed positions, and moving the first, second and third trailing edges be offset from each other when the trailing edge devices are in their deployed positions.

24. The method of claim 18, further comprising:
downwardly deflecting an inboard spoiler located forward of the inboard trailing edge device, the inboard spoiler having a first trailing edge;
downwardly deflecting an outboard spoiler located forward of the outboard trailing edge device, outboard spoiler having a second trailing edge; and
downwardly deflecting an intermediate spoiler located forward of the intermediate trailing edge device so that a third trailing edge of the intermediate spoiler forms a generally continuous, composite trailing edge with the first and second trailing edges.

25. The method of claim 24 wherein each of the trailing edge devices is movable to multiple deployed positions, and wherein each of the spoilers is movable to corresponding multiple downwardly deflected positions, and wherein for each of the multiple downwardly deflected positions, the spoilers are moved so that the first, second and third trailing edges form a composite trailing edge profile that follows a generally monotonic function.

* * * * *